United States Patent
Hada (10) Patent No.: US 10,300,543 B2
(45) Date of Patent: May 28, 2019

(54) WIRE ELECTRIC DISCHARGE MACHINE

(71) Applicant: FANUC CORPORATION, Yamanashi (JP)

(72) Inventor: Keita Hada, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 15/795,748

(22) Filed: Oct. 27, 2017

(65) Prior Publication Data

US 2018/0117693 A1 May 3, 2018

(30) Foreign Application Priority Data

Nov. 1, 2016 (JP) .................................. 2016-214384

(51) Int. Cl.
 *B23H 7/20* (2006.01)
 *G05B 19/00* (2006.01)
 (Continued)

(52) U.S. Cl.
 CPC ............... *B23H 7/20* (2013.01); *B23H 7/105* (2013.01); *B23H 7/26* (2013.01); *G05B 19/182* (2013.01);
 (Continued)

(58) Field of Classification Search
 CPC . B23H 7/10; B23H 7/065; B23H 7/02; B23H 7/04; B23H 7/101; B23H 7/102; B23H 7/08; B23H 1/02
 See application file for complete search history.

(56) References Cited

U.S. PATENT DOCUMENTS

| | | | | | |
|---|---|---|---|---|---|
| 4,392,195 A | * | 7/1983 | Inoue | ..................... | B23H 7/065 |
| | | | | | 219/69.12 |
| 4,885,449 A | * | 12/1989 | Suzuki | ..................... | B23H 7/20 |
| | | | | | 219/69.11 |

(Continued)

FOREIGN PATENT DOCUMENTS

| | | | | |
|---|---|---|---|---|
| EP | 2926936 A1 | * | 10/2015 | ............... B23H 7/02 |
| JP | H06-8107 A | | 1/1994 | |

(Continued)

OTHER PUBLICATIONS

An Office Action; "Notification of Reasons for Refusal," mailed by the Japanese Patent Office dated Feb. 6, 2018, which corresponds to Japanese Patent Application No. 2016-214384 and is related to U.S. Appl. No. 15/795,748.

(Continued)

*Primary Examiner* — Ronald D Hartman, Jr.
(74) *Attorney, Agent, or Firm* — Studebaker & Brackett PC (57) ABSTRACT

To provide a wire electric discharge machine which can appropriately perform thermal displacement correction of upper/lower guides even when the installation environment changes. Provided are a storage unit that stores temperatures of machine elements as temperature data, and a rendering unit that digitizes the installation environment and renders as environmental data. Additionally provided are a position command unit that commands a relative position of the upper/lower guides; and a relational expression calculation unit that sets the temperature data environmental data as input data, sets the relative position as training data, and calculates the relational expression by way of machine learning. Further provided are a relational expression decision unit that calculates a correction amount by substituting the temperature of the machine element into this relational expression, and in the case of error between the relative (Continued)

position of the upper/lower guides based on this correction amount and the relative position commanded by the position command unit being small, decides this relational expression as a formal relational expression; and a correction execution unit that performs correction on the relative position of the upper/lower guides using this relational expression.

4 Claims, 5 Drawing Sheets

(51) Int. Cl.
    *G05B 19/404*     (2006.01)
    *B23H 7/10*     (2006.01)
    *B23H 7/26*     (2006.01)
    *G05B 19/18*     (2006.01)

(52) U.S. Cl.
    CPC .. *G05B 19/404* (2013.01); *G05B 2219/32335* (2013.01); *G05B 2219/33034* (2013.01); *G05B 2219/45221* (2013.01); *G05B 2219/49206* (2013.01); *G05B 2219/49209* (2013.01)

(56) References Cited

U.S. PATENT DOCUMENTS

| | | | |
|---|---|---|---|
| 5,523,953 A | | 6/1996 | Araie et al. |
| 6,008,461 A | * | 12/1999 | Iezawa ..................... B23H 1/02 219/69.12 |
| 6,566,835 B1 | * | 5/2003 | Yoshida ............... G05B 19/404 318/569 |
| 6,979,794 B1 | * | 12/2005 | Nakashima ............. B23H 7/04 219/69.12 |
| 10,105,776 B2 | * | 10/2018 | Hada ........................ B23H 7/04 |
| 2003/0205984 A1 | * | 11/2003 | Yoshida ............... G05B 19/404 318/801 |
| 2005/0265854 A1 | * | 12/2005 | Arakawa .................. B23H 1/10 417/243 |
| 2007/0175814 A1 | * | 8/2007 | Kita ......................... B23H 1/10 210/421 |
| 2007/0278190 A1 | * | 12/2007 | Kita ......................... B23H 1/10 219/69.12 |
| 2012/0048832 A1 | * | 3/2012 | Kasai ....................... B23H 1/02 219/69.12 |
| 2013/0206730 A1 | * | 8/2013 | Furukawa ................ B23H 7/04 219/69.12 |
| 2013/0325164 A1 | | 12/2013 | Wwatanabe et al. |
| 2015/0283636 A1 | | 10/2015 | Yoshizaki et al. |
| 2016/0263690 A1 | * | 9/2016 | Hada ........................ B23H 7/04 |
| 2018/0021869 A1 | * | 1/2018 | Nishikawa ............. B01D 35/02 700/162 |
| 2018/0117693 A1 | * | 5/2018 | Hada ........................ B23H 7/26 |
| 2018/0122623 A1 | * | 5/2018 | Hada ................. H01J 37/32724 |
| 2018/0210889 A1 | * | 7/2018 | Yoshida ................. B23H 7/102 |

FOREIGN PATENT DOCUMENTS

| | | |
|---|---|---|
| JP | H07-075937 A | 3/1995 |
| JP | H11-114776 A | 4/1999 |
| JP | 2003-039278 A | 2/2003 |
| JP | 2012-200854 A | 10/2012 |
| JP | 5870143 B2 | 2/2016 |
| TW | I228438 B | 3/2005 |

OTHER PUBLICATIONS

The extended European search report issued by the European Patent Office on Mar. 8, 2018, which corresponds to European Patent Application No. 17199132.6-1205 and is related to U.S. Appl. No. 15/795,748.

An Office Action issued by the Taiwanese Patent Office dated Jan. 23, 2019, which corresponds to Taiwanese Patent Application No. 106137611 and is related to U.S. Appl. No. 15/795,748; with English language translation.

* cited by examiner

WIRE ELECTRIC DISCHARGE MACHINE

This application is based on and claims the benefit of priority from Japanese Patent Application No. 2016-214384, filed on 1 Nov. 2016, the content of which is incorporated herein by reference.

BACKGROUND OF THE INVENTION

Field of the Invention

The present invention relates to a wire electric discharge machine that performs electric discharge machining on a workpiece, by causing the workpiece and a wire electrode mounted between an upper guide and lower guide to relatively move, in a state in which the upper guide and lower guide are arranged at predetermined relative positions.

Related Art

Such a wire electric discharge machine is configured by a plurality of machine elements being combined, and the thermal expansion coefficients of these machine elements differ from each other. Therefore, due to factors such as a change in the temperature of the environment, there is concern over a plurality of machine elements thermally deforming and the relative positions of the upper guide and lower guide displacing in three-dimensional directions (X-axis direction, Y-axis direction, Z-axis direction). If positional shift in the horizontal direction (X-axis direction, Y-axis direction) occurs in particular, it will be directly linked to a decline in machining precision. Therefore, in order to prevent a change in the temperature of the environment, countermeasures for temperature management by installing the wire electric discharge machine in a temperature-controlled room or the like have also been considered; however, the investment of a great sum of capitol is required in order to install a temperature-controlled room of adequate performance.

For this reason, as a method of maintaining machining precision inexpensively, a technique of performing correction by assuming a thermal displacement amount of the upper and lower guides based on temperature information detected by a temperature sensors installed to various parts of the machine, so-called thermal displacement correction, has been proposed.

Upon performing this thermal displacement correction, if considering that there are cases where the temperature of the surroundings change from the installation environment of the wire electric discharge machine changing, it is desirable to be able to suitably perform thermal displacement correction continuously, even if the installation environment of the wire electric discharge machine changed, for example. In order to respond to such demands, technology has been proposed that obtains an appropriate thermal displacement correction amount irrespective of the installation environment of the wire electric discharge machine (for example, refer to Patent Documents 1 and 2).
Patent Document 1: Japanese Patent No. 5870143
Patent Document 2: Japanese Unexamined Patent Application, Publication No. H7-75937

SUMMARY OF THE INVENTION

However, with the technology described in Patent Document 1, machine learning is not being used upon decision of the correction amount computing equation, and there is a possibility of not being able to adjust to the optimum correction amount simply by using a factor, depending on the way of selecting the correction amount computing equation to be created in advance.

In addition, with the technology described in Patent Document 2, the correction amount is calculated using the same data in the case of the installation environment of the wire electric discharge machine not differing extremely, and the difference in correction amount due to the installation environment of the wire electric discharge machine is not given much consideration. Furthermore, although a method of recalculating the correction equation by repeating the measurement of data after installing the wire electric discharge machine is disclosed in Patent Document 2, this involves a disadvantage in that work hours are required at the factory.

The present invention takes account of such a situation, and has an object of providing a wire electric discharge machine capable of suitably performing thermal displacement correction on upper/lower guides, even if the installation environment changes.

A wire electric discharge machine (e.g., the wire electric discharge machine 1 described later) according to a first aspect of the present invention is a wire electric discharge machine configured from a plurality of machine elements (e.g., the bed 2, column 3, X-axis saddle 9, Y-axis saddle 10, etc. described later), and performing electric discharge machining on a workpiece (e.g., the work W described later) in a state in which an upper guide (e.g., the upper guide 8 described later) and a lower guide (e.g., the lower guide 15 described later) are disposed at predetermined relative positions, by causing the workpiece and a wire electrode (e.g., the wire electrode 16 described later) installed between the upper guide and the lower guide to relatively move, the wire electric discharge machine including: a temperature detection means (e.g., the temperature sensors S1 to S7 described later) for detecting temperature of at least one machine element among the plurality of machine elements; a storage means (e.g., the storage unit 21 described later) for storing temperatures detected by the temperature detection means as temperature data; a rendering means (e.g., the rendering unit 22 described later) for digitizing an installation environment, and rendering as environmental data; a position command means (e.g., the position command unit 23 described later) for commanding a relative position of the upper guide and the lower guide; a relational expression calculation means (e.g., the relational expression calculation unit 24 described later) for calculating a relational expression by way of the machine learning for obtaining a correction amount required in order to correct the relative position of the upper guide and the lower guide, by setting the temperature data stored in the storage means and the environmental data rendered by the rendering means as input data, and setting a relative position commanded by the position command means as training data; a relational expression decision means (e.g., the relational expression decision unit 29 described later) for calculating a correction amount by substituting the temperature detected by the temperature detection means into the relational expression calculated by the relational expression calculation means, obtaining error between the relative position of the upper guide and the lower guide based on said correction amount and the relative position commanded by the position command means, and determining whether said error is small, and in the case of being determined that said error is not small, modifying the relational expression by repeating calculation of the relational expression by way of machine learning, and in the case of being determined that said error is small, deciding said relational expression as a formal relational expression; and a correction execution means (e.g., the correction execution unit 25 described later) for calculating an estimated value for the relative position by substituting the temperature detected by the temperature detection means into the relational expression decided by the relational expression decision means, then calculating a correction amount for the upper guide and the lower guide based on said estimated value for the relative position, and performing correction on the relative position of the upper guide and the lower guide based on said correction amount.

According to a second aspect of the present invention, the wire electric discharge machine as described in the first aspect may further include: a data sharing means (e.g., the data sharing unit 26 described later) for sharing a plurality of the relational expressions for cases of installation environments differing; a determination means (e.g., the determination unit 27 described later) for determining whether the plurality of the relational expressions shared by the data sharing means are in agreement with each other; and a relational expression modification means (e.g., the relational expression modification unit 28 described later) for, in a case of the determination means determining that the plurality of the relational expressions shared by the data sharing means are not in agreement with each other, modifying the relational expression by repeating calculation of the relational expression by way of the machine learning, and in a case of the determination means determining that the plurality of the relational expressions shared by the data sharing means are in agreement with each other, formally adopting said relational expression.

According to a third aspect of the present invention, in the wire electric discharge machine as described in the first or second aspect, the relational expression calculation means may perform the machine learning by following a learning model constructed by way of a multi-layered neural network.

According to the present invention, it is possible to calculate the correction amount of upper/lower guides in a form in which the difference in installation environments thereof are reflected for a wire electric discharge machine. For this reason, even if the installation environment of the wire electric discharge machine changes, it is possible to suitably perform thermal displacement correction of the upper/lower guides.

DETAILED DESCRIPTION OF THE INVENTION

Hereinafter, a first embodiment of the present invention will be explained based on the drawings.

First Embodiment

Figure 1:
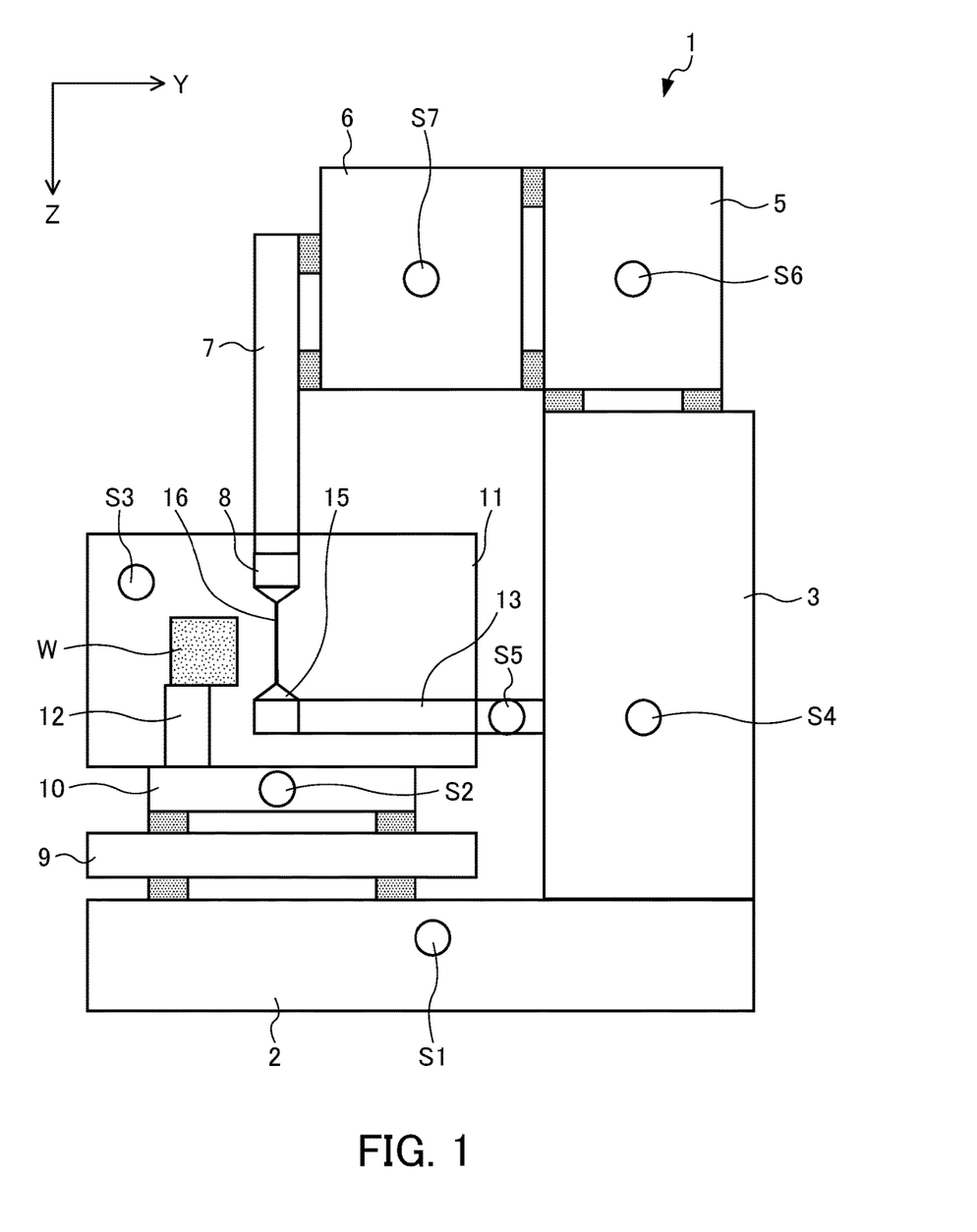
FIG. 1 is a front view showing an outline configuration of a wire electric discharge machine according to a first embodiment of the present invention.
Figure 2:
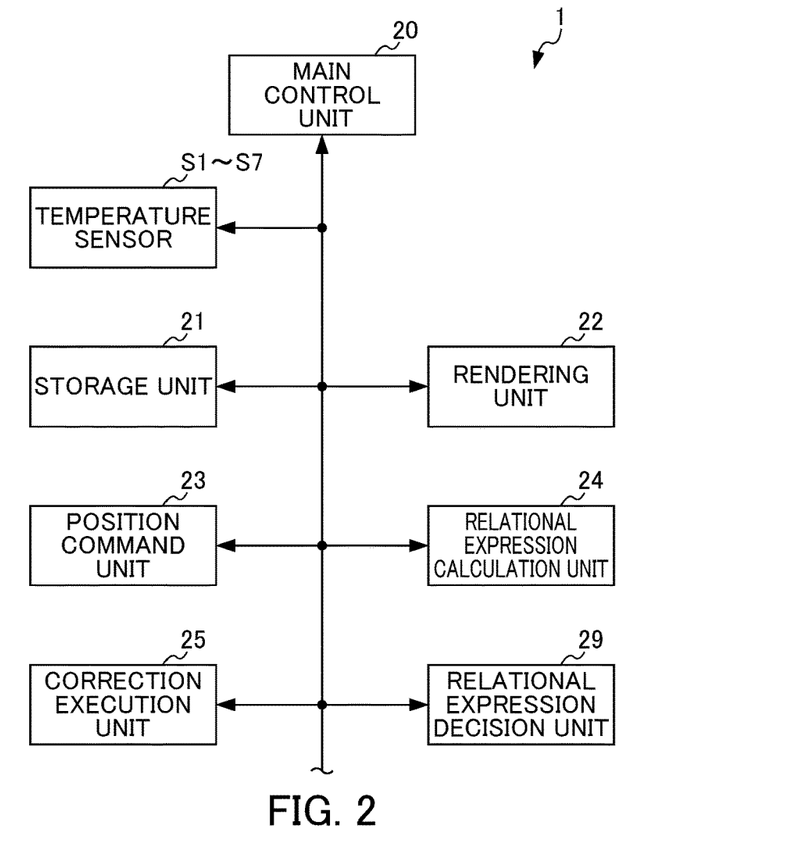
FIG. 2 is a block diagram showing a control system of the wire electric discharge machine according to the first embodiment of the present invention.

FIG. 1 is a front view showing an outline configuration of a wire electric discharge machine according to the first embodiment of the present invention. FIG. 2 is a block diagram showing a control system of this wire electric discharge machine. FIG. 4 is a schematic diagram of a multi-layered neural network. FIG. 4 is a flowchart showing a sequence of deciding a relational expression between the temperature of machine elements and relative positions of upper/lower guides, in this wire electric discharge machine.

The wire electric discharge machine 1 according to the first embodiment is configured from a plurality of machine elements such as a bed 2, column 3, V-axis saddle 5, U-axis saddle 6, Z-axis saddle 7, X-axis saddle 9, Y-axis saddle 10, work pan 11, work table 12, and arm 13.

Herein, the X-axis saddle 9 is equipped to freely move in the X-axis direction (direction perpendicular to plane of page of FIG. 1) at an upper side of the bed 2. The Y-axis saddle 10 is equipped to freely move in the Y-axis direction (left/right direction in FIG. 1) at an upper side of the X-axis saddle 9. The work pan 11 is equipped at the upper side of the Y-axis saddle 10. The work table 12 on which the work W serving as a workpiece is placed is installed inside of the work pan 11, and is filled with working fluid.

In addition, the column 3 is installed to stand at the upper side of the bed 2. The arm 13 is mounted horizontally to the lateral part of the column 3, and the lower guide 15 is mounted to the leading end of the arm 13 so as to be positioned inside of the work pan 11. The V-axis saddle 5 is equipped to freely move in the V-axis direction (Y-axis direction) at an upper side of the column 3. The U-axis saddle 6 is mounted to freely move in the U-axis direction (X-axis direction) at a lateral part of the V-axis saddle 5. The Z-axis saddle 7 is mounted to freely move in the Z-axis direction (up/down direction in FIG. 1) at a lateral part of the U-axis saddle 6. The upper guide 8 is mounted to the leading end of the Z-axis saddle 7 so as to be positioned above the lower guide 15 inside of the work pan 11. The wire electrode 16 is provided in a tensioned state linearly between the upper guide 8 and lower guide 15.

Furthermore, among these machine elements, a temperature sensor 3 is mounted as a temperature detection means to a few of these machine elements, respectively. In other words, a temperature sensor S1 that detects the temperature of the bed 2 is mounted to the bed 2. A temperature sensor S2 that detects the temperature of the Y-axis saddle 10 is mounted to the Y-axis saddle 10. A temperature sensor S3 that detects the temperature of the working fluid inside of the work pan 11 is mounted to the work pan 11. A temperature sensor S4 that detects the temperature of the column 3 is mounted to the column 3. A temperature sensor S5 that detects the temperature of the arm 13 is mounted to the arm 13. A temperature sensor S6 that detects the temperature of the V-axis saddle 5 is mounted to the V-axis saddle 5. A temperature sensor S7 that detects the temperature of the U-axis saddle 6 is mounted to the U-axis saddle 6.

Furthermore, the wire electric discharge machine 1 has a main control unit 20 as shown in FIG. 2. In addition to the aforementioned seven temperature sensors S (S1-S7), a storage unit 21 as a storage means, a rendering unit 22 as a rendering means, a position command unit 23 as a position command means, a relational expression calculation unit 24 as a relational expression calculation means, a relational expression decision unit 29 as a relational expression decision means, and a correction execution unit 25 as a correction execution means are connected to the main control unit 20.

The storage unit 21 stores the temperatures detected by the respective temperature sensors S1 to S7 (temperatures of machine elements) as temperature data.

The rendering unit 22 digitizes the installation environment of the wire electric discharge machine 1 (environment in which the temperature of the wire electric discharge machine 1 rises or lowers from a disturbance, due to a cooler and/or heater being installed in the vicinity of the wire electric discharge machine 1 and operating, for example) by some technique, and renders as environmental data.

The position command unit 23 commands the relative positions of the upper/lower guides 8, 15.

The relational expression calculation unit 24 sets the temperature data stored in the storage unit 21 and the environmental data rendered by the rendering unit 22 as input data, and sets the relative positions of the upper/lower guides 8, 15 commanded by the position command unit 23 as training data, and then calculates the relational expression for obtaining the correction amount needed in order to correct the relative positions of the upper/lower guides 8, 15 by way of machine learning.

Figure 3:
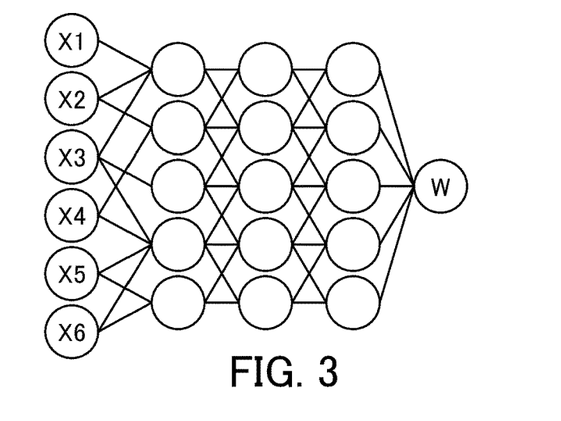
FIG. 3 is a schematic diagram of a multi-layered neural network.
Figure 4:
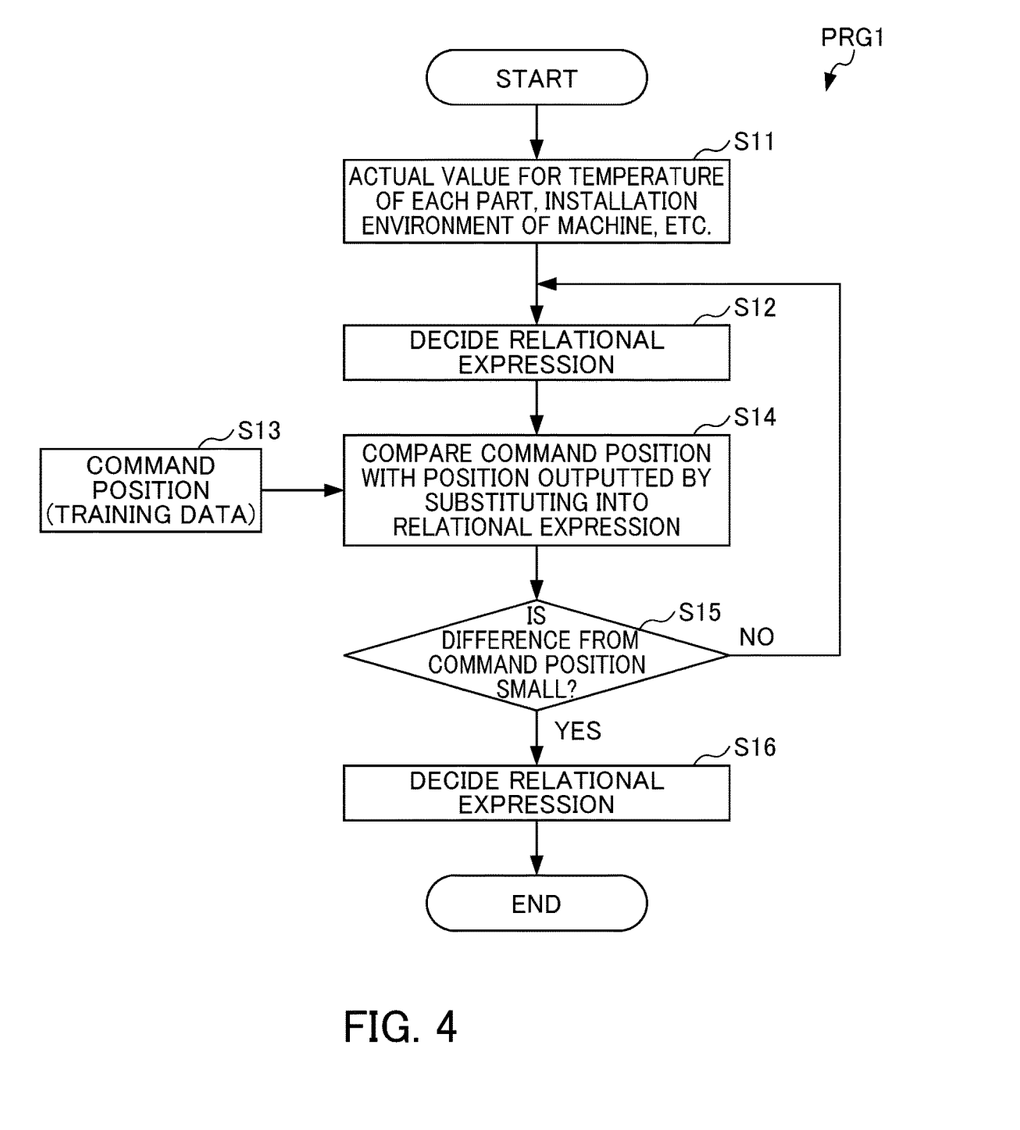
FIG. 4 is a flowchart showing a sequence of deciding a relational expression between the temperature of machine elements and relative positions of upper/lower guides, in the wire electric discharge machine according to the first embodiment of the present invention.

Upon this machine learning, deep learning is performed following a learning model (algorithm) constructed by a multi-layered neural network as shown in FIG. 3. In FIG. 3, X1 to X6 represent the respective input data (temperature data and environmental data in the present embodiment), and W represents output data (relational expression in the present embodiment).

The relational expression decision unit 29 calculates a correction amount by substituting temperature detected by the temperature sensor S into the relational expression calculated by the relational expression calculation unit 24, obtains an error between the relative positions of the upper/lower guides 8, 15 based on this correction amount and the relative position commanded by the position command unit 23, and determines whether or not this error is small, and in the case of being determined that this error is not small, repeats the calculation of the relational expression by way of machine learning to modify the relational expression, and in the case of being determined that this error is small, decides this relational expression as the formal relational expression.

The correction execution unit 25 substitutes temperature detected by the temperature sensor S into the relational expression calculated by the relational expression calculation unit 24, calculates an estimated value for the relative positions of the upper/lower guides 8, 15, and based on this estimated value for the relative position, calculates the correction amount for the upper/lower guides 8, 15, and performs correction for the relative positions of the upper/lower guides 8, 15 based on this correction amount.

Since the wire electric discharge machine 1 has the above such configuration, the following sequence is followed upon performing electric discharge machining on a work W using this wire electric discharge machine 1. It should be noted that electric discharge machining of this work W is executed based on the commands from the main control unit 20.

First, in response to the machined form of the work W, the upper guide 8 is positioned at a predetermined three-dimensional position relative to the lower guide 15, by causing the V-axis saddle 5, U-axis saddle 6 and Z-axis saddle 7 to move appropriately. Next, a high-frequency voltage is applied to the wire electrode 16 from a machining power supply (not illustrated). In this state, the work W is made to relatively move in relation to this wire electrode 16, by causing the X-axis saddle 9 to move in the X-axis direction, and causing the Y-axis saddle 10 to move in the Y-axis direction.

In electric discharge machining of the work W done in this way, there is concern over the relative positions of the upper/lower guides 8, 15 shifting due to factors such as a change in the temperature of the environment, and the machining precision declining. Therefore, in order to perform thermal displacement correction of the upper/lower guides 8, 15, prior to electric discharge machining of the work W, a relational expression between the temperatures of each machine element and the relative positions of the upper/lower guides 8, 15 is sought based on the relational expression decision program PRG1 shown in FIG. 4, as mentioned below. It should be noted that this thermal displacement correction is executed based on the commands from the main control unit 20. In addition, as stages for this thermal displacement correction, prior to factory delivery or during initial setting of the wire electric discharge machine 1, during maintenance, or the like are desired.

First, in Step S11, the storage unit 21 stores the output values of the respective temperature sensors S1 to S7 (temperatures of the bed 2, Y-axis saddle 10, working fluid inside of work pan 11, column 3, arm 13, V-axis saddle 5, and U-axis saddle 6) as temperature data. At this time, the plurality of measurement times is preferably times at which the output values of the temperature sensors S1 to S7 differ. In addition, the rendering unit 22 digitizes the installation environment of the wire electric discharge machine 1 for the same plurality of measurement times, and renders as environmental data.

Next, in Step S12, the relational expression calculation unit 24 calculates a relational expression by way of deep learning with the temperature data stored in the storage unit 21 and the environmental data rendered by the rendering unit 22 as input data, and the relative positions of the upper/lower guides 8, 15 commanded by the position command unit 23 as training data.

Next, in Steps S13 and S14, the relational expression decision unit 29 calculates a correction amount by substituting output values of the respective temperature sensors S1 to S7 into this relational expression, and obtaining the error between the relative positions of the upper/lower guides 8, 15 based on this correction amount and the relative positions of the upper/lower guides 8, 15 commanded by the position command unit 23.

Subsequently, in Step S15, the relational expression decision unit 29 determines whether or not this error is small. Determination of this magnitude relationship can be determined by providing a predetermined threshold, and determining whether or not smaller than this threshold.

As a result thereof, in the case of being determined that this error is not small, since it is considered that the probability of this relational expression being statistically suitable is low, the processing returns to Step S12, and repeats the calculation of the relational expression by way of machine learning. On the other hand, in the case of being determined that this error is small, since it is considered that the probability of this relational expression being statistically suitable is high, the processing advances to Step S16, and the relational expression decision unit 29 decides this relational expression as the formal relational expression.

Herein, the operations for obtaining the relational expression between the temperatures of each machine element and the relative positions of the upper/lower guides 8, 15 are completed.

Upon the relational expression between the temperatures of each machine element and the relative positions of the upper/lower guides 8, 15 being obtained by configuring in this way, this relational expression is stored. Then, upon electric discharge machining of the work W, thermal displacement correction of the upper/lower guides 8, 15 is performed using this relational expression.

In other words, first, the position estimation unit 23 calculates the estimated value for the relative positions of the upper/lower guides 8, 15, by substituting the temperatures of each machine element detected by the respective temperature sensors S1 to S7 in this relational expression. Next, the correction amount calculation unit 24 calculates the correction amount for the upper/lower guides 8, 15, based on the estimated value for the relative positions of the upper/lower guides 8, 15. Finally, the correction execution unit 25 performs correction of the relative positions of the upper/lower guides 8, 15, based on this correction amount of the upper/lower guides 8, 15.

In the above way, according to the present embodiment, it is possible to calculate the correction amount for the upper/lower guides 8, 15 in a form in which the difference in installation environments is reflected for the wire electric discharge machine 1. For this reason, even if the installation environment of the wire electric discharge machine 1 changes, it is possible to suitably perform thermal displacement correction of the upper/lower guides 8, 15.

In addition, upon calculating the relational expression for obtaining the correction amount required in order to correct the relative positions of the upper/lower guides 8, 15, deep learning is being performed. As a result thereof, it is possible to realize an effective determination much more accurately, by repeating learning until the calculation converges by way of deep learning.

Second Embodiment

Figure 5:
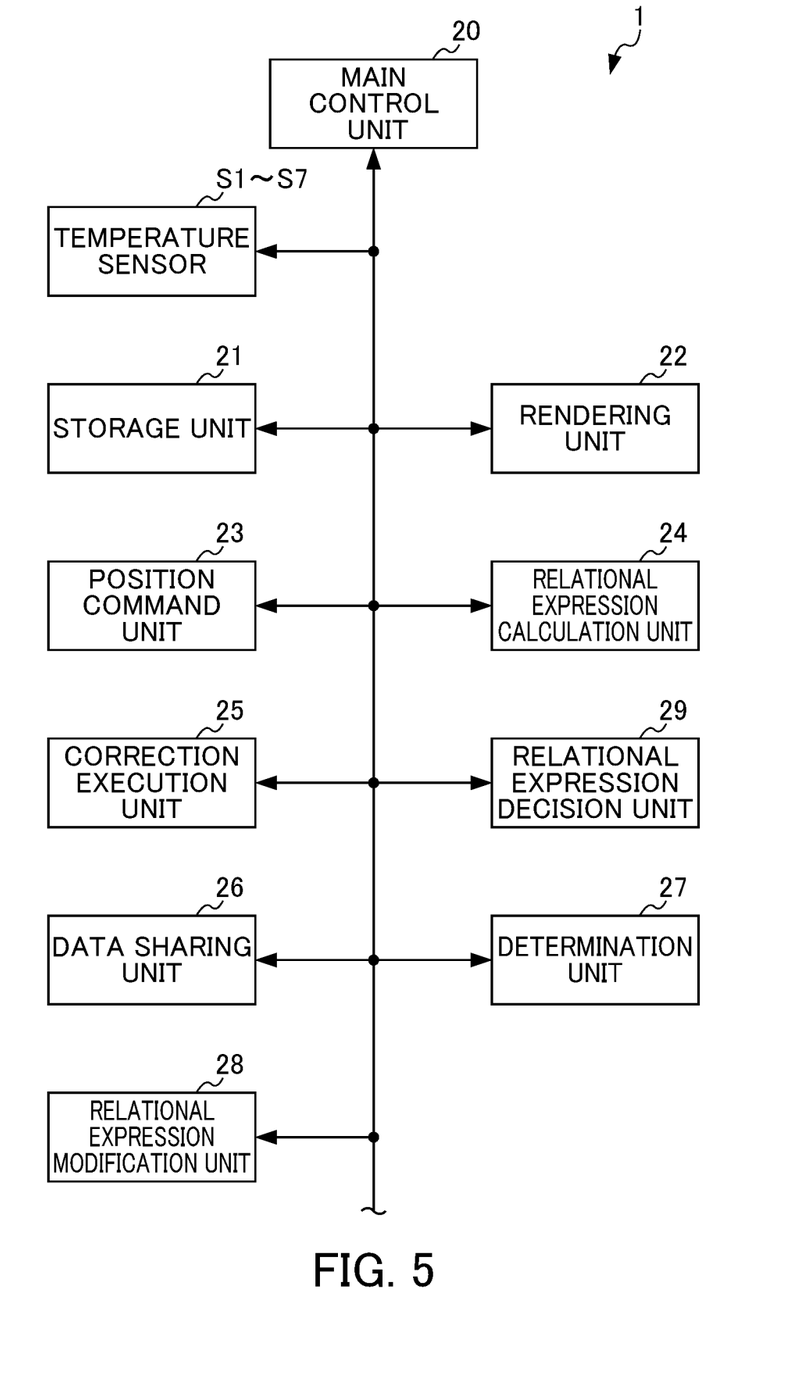
FIG. 5 is a block diagram showing a control system of a wire electric discharge machine according to a second embodiment of the present invention.
Figure 6:
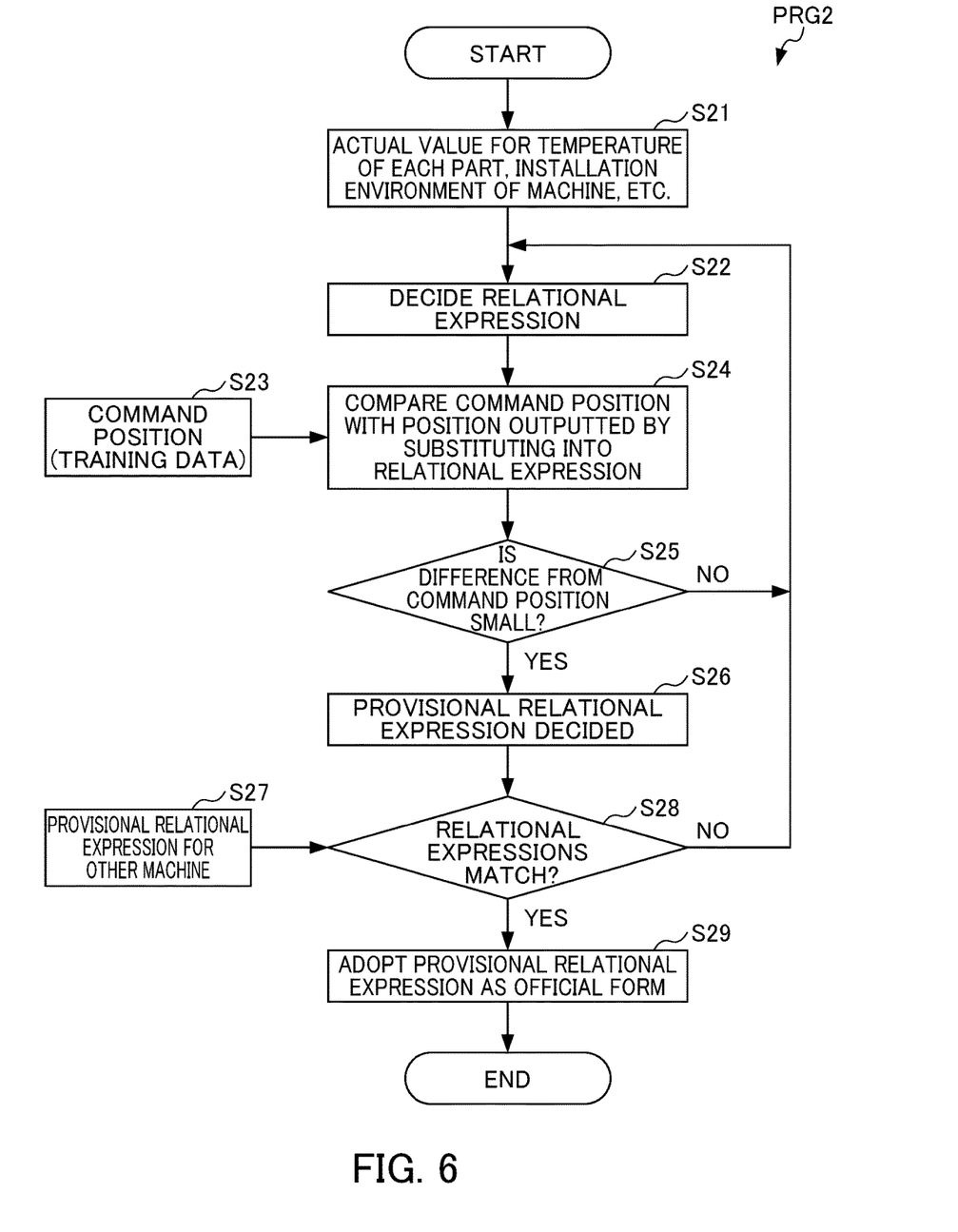
FIG. 6 is a flowchart showing a sequence of deciding a relational expression between the temperature of machine elements and relative positions of upper/lower guides, in the wire electric discharge machine according to the third embodiment of the present invention.

FIG. 5 is a block diagram showing a control system of a wire electric discharge machine according to a second embodiment of the present invention. FIG. 6 is a flowchart showing a sequence of deciding a relational expression between the temperatures of the machine element and relative positions of the upper/lower guides, in this wire electric discharge machine.

For the wire electric discharge machine 1 according to the second embodiment, a data sharing unit 26 as a data sharing means, a determination unit 27 as a determination means, and a relational expression modification unit 28 as a relational expression modification means are added in the control system thereof, as shown in FIG. 5. Since other configurations are basically the same as the aforementioned first embodiment, the same reference symbols are assigned for identical members, and explanations thereof are omitted.

The data sharing unit 26 shares a plurality of relational expressions for cases in which the installation environment of the wire electric discharge machine 1 differs.

The determination unit 27 determines whether or not the plurality of relational expression shared by the data sharing unit 26 are in agreement with each other.

The relational expression modification unit 28, in the case of being determined by way of the determination unit 27 that the plurality of relational expression are not in agreement with each other, modifies the relational expression by repeating the calculation of the relational expression by way of machine learning, and in the case of being determined that the plurality of relational expression are in agreement with each other, adopts this relational expression as the official form.

Next, in the wire electric discharge machine 1 according to the present embodiment, a relational expression decision program PRG2 shown in FIG. 6 is followed upon obtaining the relational expression between the temperatures of each machine element and the relative positions of the upper/lower guides 8, 15.

First, in Step S21, the storage unit 21 executes the same processing as Step S11 in the aforementioned first embodiment.

Next, in Step S22, the relational expression calculation unit 24 executes the same processing as Step S12 in the aforementioned first embodiment.

Subsequently, in Steps S23 and S24, the relational expression decision unit 29 executes the same processing as Steps S13 and S14 in the aforementioned first embodiment.

Next, in Step S25, the relational expression decision unit 29 executes the same processing as Step S15 in the aforementioned first embodiment.

Then, in Step S26, the relational expression decision unit 29 executes the same processing as Step S16 in the aforementioned first embodiment.

Furthermore, in Step S27, the data sharing unit 26 shares a plurality of relational expressions for cases of the installation environments of the wire electric discharge machine 1 differing.

Next, in Step S28, the determination unit 27 determines whether or not the plurality of relational expressions shared by the data sharing unit 26 are in agreement with each other.

As a result thereof, in the case of being determined that the plurality of relational expressions are not in agreement with each other, since it is not considered to be able to commonly use this relational expression for the plurality of installation environments, the processing returns to Step S22, and repeats the calculation of the relational expression by way of machine learning. On the other hand, in the case of being determined that the plurality of relational expressions are in agreement with each other, since it is considered to be able to commonly use this relational expression for the plurality of installation environments, the processing advances to Step S29, and the relational expression modification unit 28 adopts this relational expression as the official form.

Herein, the operations for obtaining the relational expression between the temperatures of each machine element and the relative positions of the upper/lower guides 8, 15 are completed.

Upon the relational expression between the temperature of each machine element and the relative positions of the upper/lower guides 8, 15 being obtained by configuring in this way, this relational expression is stored. Then, upon the electric discharge machining of the work W, the thermal displacement correction of the upper/lower guides 8, 15 is performed using this relational expression, according to a similar sequence as the aforementioned first embodiment.

In the above way, the present embodiment exerts the same functional effects as the aforementioned first embodiment. In addition thereto, according to the present embodiment, calculation of the relational expression is repeated by machine learning until a plurality of relational expressions are in agreement with each other. For this reason, it is possible to derive a relational expression commonly usable in a plurality of installation environments, and it becomes possible to raise the versatility of the wire electric discharge machine 1.

Other Embodiments

Although embodiments of the present invention have been explained above, the present invention is not to be limited to the aforementioned embodiments. In addition, the effects described in the present embodiments are merely exemplifying the most preferred effects produced from the present invention, and the effects according to the present invention are not to be limited to those described in the present embodiments.

In addition, although cases of performing deep learning upon calculating the relational expression for obtaining the correction amount required in order to correct the relative positions of the upper/lower guides 8, 15 have been explained in the aforementioned first embodiment and second embodiment, it is not limited to deep learning, and other machine learning can also be performed.

In addition, in the aforementioned first embodiment and second embodiment, the wire electric discharge machine 1 in which temperature sensors S are mounted to seven machine elements (bed 2, Y-axis saddle 10, working fluid inside of work pan 11, column 3, arm 13, V-axis saddle 5, U-axis saddle 6) has been explained. However, the mounting locations of the temperature sensors S are not limited to the aforementioned machine elements, and for example, temperature sensors S may be mounted to the X-axis saddle 9 and/or Z-axis saddle 7. Alternatively, it will not cause a problem even if mounting a plurality of temperature sensors S to any one machine element. Furthermore, the atmospheric temperature around the wire electric discharge machine 1 may be measured by a temperature sensor (not illustrated).

Furthermore, a wire electric discharge machine 1 of mobile-type upper guide 8 and fixed-type lower guide 15 has been explained in the aforementioned first embodiment and second embodiment. However, it is conversely possible to similarly apply the present invention to a wire electric discharge machine of fixed-type upper guide 8 and mobile-type lower guide 15. In addition, it is also possible to similarly apply the present invention to a wire electric discharge machine with both mobile-type upper guide 8 and lower guide 15.

EXPLANATION OF REFERENCE NUMERALS

1 wire electric discharge machine
22
2 bed (machine element)
3 column (machine element)
5 V-axis saddle (machine element)
6 U-axis saddle (machine element)
7 Z-axis saddle (machine element)
8 upper guide
9 X-axis saddle (machine element)
10 Y-axis saddle (machine element)
11 work pan (machine element)
12 work table (machine element)
13 arm (machine element)
15 lower guide
16 wire electrode
21 storage unit (storage means)
22 rendering unit (rendering means)
23 position command unit (position command means)
24 relational expression calculation unit (relational expression calculation means)
25 correction execution unit (correction execution means)
26 data sharing unit (data sharing means)
27 determination unit (determination means)
28 relational expression modification unit (relational expression modification means)
29 relational expression decision unit (relational expression decision means)
S, S1~S7 temperature sensor (temperature detection means)
W work (workpiece)

What is claimed is:

1. A wire electric discharge machine configured from a plurality of machine elements, and performing electric discharge machining on a workpiece in a state in which an upper guide and a lower guide are disposed at predetermined relative positions, by causing the workpiece and a wire electrode installed between the upper guide and the lower guide to relatively move, the wire electric discharge machine comprising:
   a temperature detector configured to detect temperature of at least one machine element among the plurality of machine elements;
   a storage configured to store temperatures detected by the temperature detector as temperature data;
   a rendering unit configured to digitize an installation environment, and render as environmental data;
   a position command unit configured to command a relative position of the upper guide and the lower guide;
   a relational expression calculation unit configured to calculate a relational expression by way of the machine learning for obtaining a correction amount required in order to correct the relative position of the upper guide and the lower guide, by setting the temperature data stored in the storage and the environmental data rendered by the rendering unit as input data, and set a relative position commanded by the position command unit as training data;
   a relational expression decision unit configured to calculate a correction amount by substituting the temperature detected by the temperature detector into the relational expression calculated by the relational expression calculation unit, obtain error between the relative position of the upper guide and the lower guide based on said correction amount and the relative position commanded by the position command unit, and determine whether said error is small, and in the case of being determined that said error is not small, modify the relational expression by repeating calculation of the relational expression by way of machine learning, and in the case of being determined that said error is small, decide said relational expression as a formal relational expression; and
   a correction execution unit configured to calculate an estimated value for the relative position by substituting the temperature detected by the temperature detector into the relational expression decided by the relational expression decision unit, then calculate a correction amount for the upper guide and the lower guide based on said estimated value for the relative position, and perform correction on the relative position of the upper guide and the lower guide based on said correction amount.

2. The wire electric discharge machine according to claim 1, further comprising:

a data sharing unit configured to share a plurality of the relational expressions for cases of installation environments differing;

a determination unit configured to determine whether the plurality of the relational expressions shared by the data sharing unit are in agreement with each other; and a relational expression modification unit configured to, in a case of the determination unit determining that the plurality of the relational expressions shared by the data sharing unit are not in agreement with each other, modify the relational expression by repeating calculation of the relational expression by way of the machine learning, and in a case of the determination unit determining that the plurality of the relational expressions shared by the data sharing unit are in agreement with each other, formally adopt said relational expression.

3. The wire electric discharge machine according to claim 1, wherein the relational expression calculation unit performs the machine learning by following a learning model constructed by way of a multi-layered neural network.

4. The wire electric discharge machine according to claim 2, wherein the relational expression calculation unit performs the machine learning by following a learning model constructed by way of a multi-layered neural network.

* * * * *